United States Patent
Morinaga et al.

(10) Patent No.: US 9,149,744 B2
(45) Date of Patent: Oct. 6, 2015

(54) FILTRATION METHOD, METHOD FOR PURIFYING POLISHING COMPOSITION USING IT, METHOD FOR REGENERATING FILTER TO BE USED FOR FILTRATION, AND FILTER REGENERATING APPARATUS

(75) Inventors: Hitoshi Morinaga, Kiyosu (JP); Shinji Furuta, Kiyosu (JP); Kazusei Tamai, Kiyosu (JP)

(73) Assignee: FUJIMI INCORPORATED, Kiyosu-shi (JP)

( * ) Notice: Subject to any disclaimer, the term of this patent is extended or adjusted under 35 U.S.C. 154(b) by 655 days.

(21) Appl. No.: 13/003,960

(22) PCT Filed: Jun. 24, 2009

(86) PCT No.: PCT/JP2009/061466
§ 371 (c)(1),
(2), (4) Date: Apr. 11, 2011

(87) PCT Pub. No.: WO2010/007862
PCT Pub. Date: Jan. 21, 2010

(65) Prior Publication Data
US 2011/0180483 A1    Jul. 28, 2011

(30) Foreign Application Priority Data
Jul. 14, 2008 (JP) ................. 2008-182901

(51) Int. Cl.
*B01D 65/02* (2006.01)
*B01D 29/72* (2006.01)
(Continued)

(52) U.S. Cl.
CPC ............... *B01D 29/72* (2013.01); *B01D 61/20* (2013.01); *B01D 65/02* (2013.01); *C02F 1/36* (2013.01);
(Continued)

(58) Field of Classification Search
USPC ............ 210/670, 636, 748.02, 649–654, 106, 210/321.69, 332, 356, 407, 412, 388, 391, 210/785, 791, 797, 798; 422/20, 128; 134/1
See application file for complete search history.

(56) References Cited

U.S. PATENT DOCUMENTS 6,221,118 B1    4/2001  Yoshida et al.
6,432,310 B1 *  8/2002  Andou et al. .................. 210/636
(Continued)

FOREIGN PATENT DOCUMENTS

CN    1490091    4/2004
CN    2669966    1/2005
(Continued)

OTHER PUBLICATIONS

Machine Translation of EP 1 258 276 A1 (published Nov. 20, 2002).*
(Continued)

*Primary Examiner* — Matthew O Savage
(74) *Attorney, Agent, or Firm* — Oblon, McClelland, Maier & Neustadt, L.L.P.

(57) ABSTRACT

A filtration method, that includes: (A) filtering a liquid having particles with a resin media filter; and (B) applying ultrasonic waves at a frequency of at least 30 kHz to the resin media filter during the filtering (A) or after completion of the filtering (A) to regenerate the resin media filter, where: i) a material of the resin media filter is nylon, polycarbonate, polytetrafluoroethylene (PTFE), polysulfone, polyether sulfone, and/or cellulose, ii) for the regeneration of the resin media filter, the applying results in a filter regeneration ratio of at least 0.40; iii) on a surface of the resin media filter, a support material comprising a mesh resin layer is disposed; and iv) the resin media filter is present in a filter housing having a three-dimensional shape and an ultrasonic vibrator, which generates the ultrasonic waves, is present on a lateral side of said filter housing.

13 Claims, 2 Drawing Sheets

(51) Int. Cl.
*C02F 1/36* (2006.01)
*C02F 1/44* (2006.01)
*B01D 61/20* (2006.01)
*C02F 103/34* (2006.01)

(52) U.S. Cl.
CPC .............. *C02F 1/444* (2013.01); *B01D 2315/02* (2013.01); *B01D 2315/04* (2013.01); *B01D 2321/04* (2013.01); *B01D 2321/2033* (2013.01); *B01D 2321/2075* (2013.01); *C02F 2103/346* (2013.01); *C02F 2303/16* (2013.01)

(56) References Cited

U.S. PATENT DOCUMENTS

| | | | |
|---|---|---|---|
| 6,863,700 B2 | 3/2005 | Yoshida et al. | |
| 7,008,540 B1 * | 3/2006 | Weavers et al. | 210/636 |
| 7,708,788 B2 | 5/2010 | Yoshida et al. | |
| 2002/0028632 A1 | 3/2002 | Shimamoto et al. | |
| 2003/0116487 A1 * | 6/2003 | Petersen | 210/85 |
| 2008/0006290 A1 * | 1/2008 | Yamanaka et al. | 134/1 |
| 2008/0308132 A1 | 12/2008 | Tomita et al. | |
| 2009/0314744 A1 | 12/2009 | Vacassy et al. | |

FOREIGN PATENT DOCUMENTS

| | | |
|---|---|---|
| DE | 103 49 842 A1 | 5/2005 |
| EP | 1 258 276 A1 | 11/2002 |
| JP | 51-137679 | 11/1976 |
| JP | 60 39303 | 3/1985 |
| JP | 2-307587 | 12/1990 |
| JP | 7-16439 | 1/1995 |
| JP | 7 275615 | 10/1995 |
| JP | 8 281020 | 10/1996 |
| JP | 9 299767 | 11/1997 |
| JP | 11 253763 | 9/1999 |
| JP | 2000 271457 | 10/2000 |
| JP | 2001-70762 | 3/2001 |
| JP | 2002 38131 | 2/2002 |
| JP | 2002 191945 | 7/2002 |
| JP | 2003 135937 | 5/2003 |
| JP | 2004 50137 | 2/2004 |
| JP | 2009 113148 | 5/2009 |
| WO | WO 95/21707 A1 | 8/1995 |

OTHER PUBLICATIONS

Machine Translation of JP H08-281020 (published Oct. 29, 1996).*
Human Translation of CN 2669966, published in 2005.*
International Search Report issued Sep. 15, 2009 in PCT/JP09/061466 filed Jun. 24, 2009.
Extended European Search Report issued Feb. 7, 2013, in European Patent Application No. 09797790.4.
Office Action issued Dec. 13, 2013 in Japanese Patent Application No. 2010-520813 (with English Translation).
Office Action issued Feb. 21, 2013, in Chinese Patent Application No. 200980127417.1.
Office Action issued Feb. 6, 2013, in European Patent Application No. 09797790.4.

* cited by examiner

FILTRATION METHOD, METHOD FOR PURIFYING POLISHING COMPOSITION USING IT, METHOD FOR REGENERATING FILTER TO BE USED FOR FILTRATION, AND FILTER REGENERATING APPARATUS

CROSS REFERENCE TO RELATED APPLICATION

This application is a 371 of PCT/JP2009/061466, filed on Jun. 24, 2009, and claims priority to Japanese Patent Application No. 2008-182901, filed on Jul. 14, 2008.

TECHNICAL FIELD

The present invention relates to a filtration method for various liquids particularly a liquid containing fine particles of e.g. a polishing composition as a dispersoid, and a method for regenerating a filter used for filtration.

BACKGROUND ART

In polishing employing a polishing composition and a polishing pad, demands for a polished surface with high smoothness free from defects is increasingly high year by year. Along with such a tendency, the particle size of abrasive grains contained in a polishing composition becomes smaller. Further, in general, the particle size of abrasive grains is distributed, and if coarse particles which are extremely large relative to the aimed particle size are contained, such coarse particles will lead to surface defects such as scratches, and accordingly they should be removed.

Such coarse particles dispersed in a liquid medium are usually removed by a filter. In order to capture the coarse particles efficiently, it is desired to use a filter having a smaller aperture. However, the smaller the aperture of a filter, the more clogging is likely to occur. If clogging occurs, the efficiency in removal of the coarse particles tends to be deteriorated and finally, the filter will no longer be used. Accordingly, a filtration method with which clogging is less likely to occur, or a method of easily eliminating the clogging if occurred, has been desired.

From such a viewpoint, various filtration methods have been studied. Patent Document 1 discloses a filter for filtration of a fluid with an increased efficiency, by directly applying ultrasonic vibration to suppress an increase in the viscosity of the fluid, or by vibration, and a filter to which back pressure cleaning is easily conducted, if the filter is clogged, by directly applying vibration to the filter thereby to decrease the viscosity of a fluid with which the filter is clogged, or thereby to break the fluid by vibration.

Patent Document 2 discloses a liquid filtration method, which comprises subjecting a liquid to filtration while continuously or intermittently applying ultrasonic waves.

Patent Document 3 discloses a filtration apparatus comprising a filter such as a hollow fiber membrane, a nonwoven fabric, an open cell sponge, fibers or particles contained in a housing, wherein ultrasonic vibrators are respectively provided to two facing edge faces of the housing, at such positions that the phases of ultrasonic waves generated by the vibrators will not coincide with each other.

The above documents disclose to utilize ultrasonic waves for the purpose of improving the filter property, but failed to provide a method effective for a step of removing coarse particles (several hundred to several thousand nm) in polishing composition particles of from several ten to several hundred nm.

PRIOR ART

Patent Documents

Patent Document 1: JP-A-2004-050137
Patent Document 2: JP-A-08-281020
Patent Document 3: JP-A-07-275615

DISCLOSURE OF THE INVENTION

Under these circumstances, it is an object of the present invention to provide a filtration method and a filter regenerating method which satisfy all of removal of clogging, prolongation of the filter and lengthening of the filter replacement interval.

Means to Accomplish the Object

The filtration method of the present invention is a filtration method which comprises subjecting a liquid to filtration by using a resin media filter, wherein ultrasonic waves at a frequency of at least 30 kHz are applied to the filter at the time of the filtration or after completion of the filtration.

Further, the method for purifying a polishing composition of the present invention comprises subjecting the polishing composition to filtration by using the above filtration method.

Further, the method for regenerating a media filter of the present invention comprises applying ultrasonic waves at a frequency of at least 30 kHz to a used resin media filter which has been used for filtration to remove fine particle components from a dispersion liquid or a dispersion having insoluble fine particle components dispersed in a solvent.

Still further, the filter regenerating apparatus of the present invention comprises an ultrasonic wave generating apparatus capable of applying ultrasonic waves at a frequency of at least 30 kHz to a used resin media filter immersed in a cleaning liquid.

Effects of the Invention

According to the present invention, by applying ultrasonic waves at the time of the filtration, clogging of the filter can be prevented without impairing the filtration efficiency, and the life of the filter can be prolonged. Further, by applying ultrasonic waves after completion of the filtration, foreign matters can be removed from a filter once clogged, and the filtration performance of the filter can be regenerated. Further, since such operation can be carried out while the filter is placed in a housing or a cartridge, the efficiency will hardly be impaired. Further, by carrying out the filter regeneration by another independent filter regenerating apparatus, filter regeneration can be carried out without carrying out the filtration step in a special structure.

BEST MODE FOR CARRYING OUT THE INVENTION

Liquid to be Subjected to Filtration

Figure 1:
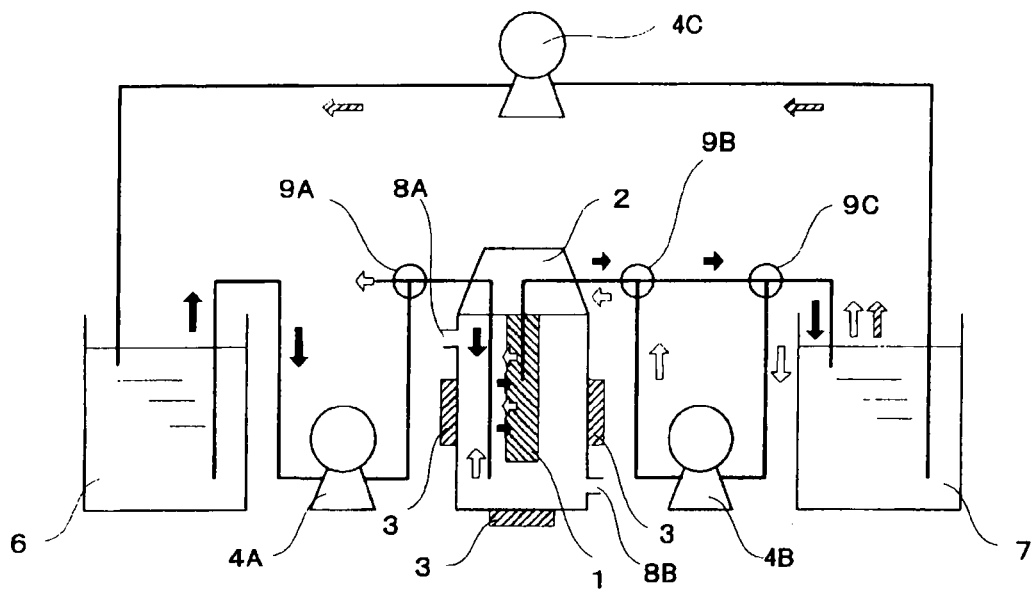
FIG. 1 is a drawing schematically illustrating filtration facilities applicable to the filtration method of the present invention.

In the filtration method of the present invention, a liquid to be subjected to filtration is not particularly limited. That is, the filtration method of the present invention can be applied to optional liquids by selecting a filter described hereinafter in accordance with components contained in the liquid and components to be removed from the liquid. However, the filtration method of the present invention is particularly effective to remove fine particle components particularly coarse particles from a dispersion liquid or a dispersion having insoluble fine particle components dispersed in a solvent. That is, the method of the present invention is preferably employed in a case of filtration while clogging of the filter is prevented for the purpose of passing particles having desired particle sizes among particles dispersed in a liquid and at the same time removing particles larger than the preferred range and other relatively large impurity components.

Accordingly, the filtration method of the present invention is preferably applied to a liquid having mainly particles of from 10 to 1,000 nm dispersed in a dispersion medium. Further, it is more preferably applied to a liquid having mainly particles of from 20 to 100 nm dispersed in a dispersion medium. Here, the particle size is as measured by a BET method. As a method of measuring the particle size, a light scattering method, a laser diffraction method and the like are mentioned. The particle sizes measured by such other methods can hardly be directly compared with the particle size measured by the BET method, but the particle size measured by a method other than the BET method may sometimes be utilized considering the principle of the measurement method, etc.

One of specific examples of such a liquid is a polishing composition. A polishing composition is one containing abrasive grains such as oxide particles of e.g. alumina, silica, ceria, titania or zirconia or particles of diamond, silicon nitride or boron nitride, to polish a silicon substrate, a silicon carbide substrate, a metal oxide, a semiconductor device substrate, a substrate for a hard disk, glass or a plastic. Among them, the polishing composition to which the filtration method of the present invention is preferably applied is one containing colloidal particles, and most preferred is one containing colloidal silica. The filtration method of the present invention is preferably applied to removal of impurities such as coarse particles contained in the raw material and in addition, agglomerates and foreign matters formed at the time of preparation, from such a polishing composition.

Further, the filtration method of the present invention is preferably applied also to the raw material, not the polishing composition itself. That is, the filtration method of the present invention is preferably used to remove undissolved substances, foreign matters and the like contained in various additive solutions other than the abrasive grains, for the purpose of removing coarse particles, a gel, foreign matters and the like from a dispersion liquid containing fine abrasive grains to be the raw material for the polishing composition.

Application of the filtration method of the present invention to the polishing composition is not limited to a stage before the polishing composition is packed in a container as a product. The filtration method of the present invention may be used also before a user is practically use the polishing composition for polishing, or when a once used polishing composition is regenerated for recycling.

Filtration Method

The filtration method of the present invention comprises subjecting the above liquid to filtration by using a filter. In the filtration method of the present invention, it is necessary to use a resin media filter. The resin media filter is one having a filter made of a resin. It is not necessary that the entire filter is constituted by a resin, and for example, the filter may have fibers, a metal or the like as a core for improvement of the mechanical strength. However, even in such a case, it is necessary that the core is covered with a resin, and the liquid to be subjected to filtration is in contact only with the resin. Various resin media filters are known, and an optional one may be used depending upon the purpose of use. The resin media filter is preferably one comprising only a filter main body made of a resin. Further, a cartridge type comprising a filter and a cartridge containing the filter therein may also be used. Such a filter in the form of a cartridge is preferably one having its main members made of a resin and as a case requires, employing a rubber for e.g. a gasket, and containing no metal at all. As such a media filter, various products are commercially available for separation of fine particles or for microbial separation, and any one of them may be used.

A resin media filter is classified into a nonwoven type wherein fibers made of a resin such as a polypropylene are formed randomly and uniformly to have a certain thickness, and a membrane type comprising a resin membrane having holes at a level of from 0.01 to several μm made. In the present invention, either type may be used, and in view of the filtration accuracy, it is preferred to use a membrane filter.

Further, the membrane filter is roughly classified into the following two manners. One is a planar filter which is a planar membrane itself. The other is such a type that facing sides of a quadrangular planar membrane are joined to form the membrane into a pipe shape, which is further pleated to make it compact. Generally, one or both ends of such a pipe-form filter are processed to prevent a leak, and such a pipe-form filter is handled as contained in a cartridge in many cases. Usually, for industrial use, a pipe-form or stereoscopic filter in a cartridge form, contained in a cartridge, is preferably used, which has a large filtration area and is excellent in handling efficiency.

The material of the membrane filter is not particularly limited but is preferably inactive to a liquid to be subjected to filtration. In a case where the liquid is aqueous, a membrane filter made of a common resin may be used. Specifically, the material of the membrane filter is preferably nylon, polycarbonate, polytetrafluoroethylene (PTFE), polysulfon, polyethersulfon or cellulose. As specific examples of the nylon, nylon 6 or nylon 66 may be mentioned. The cellulose includes a derivative having hydroxy groups substituted, and as specific examples, cellulose acetate and cellulose ester may be mentioned. Further, as described hereinafter, in the filtration method of the present invention, ultrasonic waves are applied to the filter, and at that time, it is preferred that impurities caught in the filter are readily removed. From such a viewpoint, nylon, polycarbonate or PTFE is preferred, and nylon is most preferred.

As such a membrane filter, various products are commercially available, and such products may, for example, be VARAFINE series (tradename) and ULTIPOR N66 (tradename) manufactured by PALL CORPORATION, acetate membrane filter (tradename), for example, Nuclepore (tradename) manufactured by Advantec Toyo Kaisha, Ltd.

With respect to the filtration accuracy of a filter, optional one may be employed depending upon the type of the liquid to be subjected to filtration, components contained, the size of impurities to be removed, and the like. For example, in order for efficient removal from a common polishing composition, the filtration accuracy of the filter is preferably at most 5 μm, more preferably at most 1 μm, furthermore preferably at most 0.5 μm, most preferably at most 0.3 μm. A filtration accuracy of 0.3 μm is defined that 99.9% or more of particles of at least 0.3 μm are removed.

In the filtration method of the present invention, it is necessary to apply ultrasonic waves at the time of the filtration or after the filtration. That is, by applying ultrasonic waves, clogging of the filter with particles is prevented, and the particles are removed from the clogged filter to regenerate the filter.

In the filtration method of the present invention, the frequency of ultrasonic waves to be applied is essentially at least 30 kHz, preferably at least 50 kHz, most preferably at least 70 kHz. If the frequency of the ultrasonic waves is too low, the filter may be broken. On the other hand, if the frequency is excessively high, the filter regeneration ratio tends to be decreased, and accordingly with a view to keeping a favorable filter regeneration ratio, the frequency of ultrasonic waves is preferably at most 900 kHz, more preferably at most 200 kHz, most preferably at most 100 kHz.

In the present invention, the lower the frequency of ultrasonic waves to be applied to the filter, the higher the regeneration or cleaning effect tends to be. On the other hand, when the frequency is low, the filter tends to be broken.

Here, in order to prevent breakage of the filter, in addition to adjusting the frequency of ultrasonic waves, the filter may be made less breakable. For example, on the surface of a membrane filter, a layer made of a coarse mesh resin not to inhibit the filtration, such as polyethylene or polypropylene, may be provided for strengthening. Such a membrane filter having a resin layer disposed as a support material on the filter surface is commercially available. Further, a filter having a metal or fibers embedded therein as a core of the filter may also be used. By using such a filter having a strengthened structure, ultrasonic waves at a lower frequency may be applied, whereby the regeneration ratio and the like can be more improved.

From such a viewpoint, in a case where the filter has no support material or is not specifically reinforced, it is preferred to apply ultrasonic waves at a slightly higher frequency. Specifically, it is preferred to employ ultrasonic waves at a frequency of at least 50 kHz, more preferably ultrasonic waves at a frequency of at least 100 kHz.

Ultrasonic waves are usually applied by an ultrasonic vibrator provided in a filter housing in which a filter is disposed or adjacent to a filter cartridge. The ultrasonic vibrator may be disposed at an optional position so long as ultrasonic waves can be applied to a filter at the time of the filtration or after the filtration. However, the position of the ultrasonic vibrator is preferably on the side face in or at the bottom of a filter housing or on the lateral surface of a filter cartridge, more preferably on the side surface closer to the filter. Further, in order that application of the ultrasonic waves to the filter may be uniformly carried out, the number and the position of the ultrasonic vibrator are preferably adjusted. Usually, an ultrasonic oscillator is connected with the ultrasonic vibrator, by which the frequency and the like of the ultrasonic waves are controlled.

Further, the output of the ultrasonic waves is preferably high for prevention of clogging and removal of impurities from the filter. However, with a view to preventing breakage of the filter, it is preferably at a certain level or lower. From such a viewpoint, the output of the ultrasonic waves is preferably from 0.1 to 3.0 W/cm$^2$. Further, the ultrasonic application time varies depending upon various conditions, and is usually preferably at least 5 minutes, more preferably from 1 to 5 hours.

Further, at the time of the filtration, the frequency of the ultrasonic waves to be applied may be constant or may be modulated. Usually, the lower the frequency of the ultrasonic waves, the more excellent the filter cleaning property. However, if the frequency is low, the interval of the change of the sound pressure of standing waves caused by incident waves and reflected waves of the ultrasonic waves tends to be long, whereby cleaning tends to be nonuniform. Thus, it is preferred to modulate the frequency of the ultrasonic waves for example by ±5% from the central value, whereby an effect of clearing nonuniformity of cleaning may sometimes be obtained.

Further, for the cleaning liquid, a chemical solution or a chemical agent in which a substance which causes clogging is dissolved may be used in combination. The chemical solution or the chemical agent to be used varies depending upon the type of the substance to be removed, and by using a cleaning liquid containing such a chemical agent, the substance to be removed can be dissolved and removed, whereby an effect of improving the cleaning performance will be obtained.

In a case where the liquid to be removed is an organic substance, it is desired to use an oxidizing agent as the chemical agent, and specifically, hydrogen peroxide, a persulfate, a hypochlorite, a chlorate or a persulfate may, for example, be used. Among them, hydrogen peroxide is preferably used.

In a case where the substance to be removed is a metal, it is desired to use as the chemical agent an acid comprising an organic acid or an inorganic acid in addition to an oxidizing agent, and it is preferred to use an inorganic acid such as nitric acid, sulfuric acid, hydrochloric acid, phosphoric acid or boric acid, and it is more preferred to use hydrogen peroxide with sulfuric acid or hydrochloric acid.

In a case where the substance to be removed is silica abrasive grains, it is desired to use an alkali compound as the chemical agent, and specifically, a hydroxide of an alkali metal, ammonia, an amine or a quaternary ammonium hydroxide is used. Among them, potassium hydroxide is preferably used. In a case where such an alkali compound is used, in order to more efficiently regenerate the filter, the concentration is preferably at least 0.1%, more preferably at least 5%. However, if the concentration of the alkali compound is excessively high, the alkali compound may cause e.g. corrosion of the filtration apparatus, and accordingly it should be usually at most 20%, preferably at most 10%.

Further, the pH of the cleaning liquid is preferably at least 8. The temperature of the cleaning liquid is not particularly limited, but depending upon the filter to be used, the filter itself may be broken if the temperature is excessively high. On the other hand, if the temperature of the cleaning liquid is low, dissolution and removal of soluble components to be removed cannot efficiently be carried out, and thus an excessively low temperature should be avoided. From such a viewpoint, the temperature of the cleaning liquid is preferably from 20 to 80° C., more preferably from 40 to 60° C.

Filtration Facilities

Facilities to remove impurities from a liquid by the filtration method of the present invention is described as follows with reference to drawings. The filtration facilities are only one example to illustrate the filtration method of the present invention, and the present invention is by no means restricted thereto.

FIG. 1 is a drawing illustrating one example of filtration facilities to which the filtration method of the present invention is applicable.

A tank 6 which stores a liquid before the filtration is connected with a filter cartridge 2 by piping via a pump 4A. Between the pump 4A and the filter cartridge 2, a three way valve 9A is provided.

In the filter cartridge 2, a resin media filter 1 is disposed, and a liquid introduced into the filter cartridge 2 through one of two liquid inlet/outlet ports provided on the filter cartridge, passes through the resin media filter and is discharged out of the filter cartridge from the other port. Further, in the filter cartridge 2, ultrasonic vibrators 3 are disposed. The vibration of the ultrasonic vibrators 3 is controlled by an ultrasonic oscillator (not shown).

The liquid discharged from the filter cartridge 2 is connected with a post-filtration tank 7 via three way valves 9B and 9C. Pipes branched from the three way valves 9B and 9C are connected to the pump 4B.

In a case where a liquid stored in the pre-filtration tank 6 is subjected to filtration, the liquid flows as follows. First, the liquid stored in the pre-filtration tank 6 is pumped out by the pump 4A and introduced into the filter cartridge 2. On that occasion, the three way valve 9A is set so that the liquid flows from the pump 4A to the filter cartridge 2. The liquid introduced into the filter cartridge 2 is subjected to filtration through the resin media filter 1 and is discharged to the post-filtration tank 7 via piping. On that occasion, the three way valves 9B and 9C are set so that the filter cartridge 2 and the post-filtration tank 7 are directly connected. This flow of the liquid is shown by black arrows in FIG. 1.

Here, ultrasonic waves are applied to the filter 1 by the ultrasonic vibrators 3 when the liquid is subjected to filtration by the filter or after the filtration. By the ultrasonic waves, clogging of the filter is prevented, or the clogged filter is regenerated.

In a case where ultrasonic waves are applied at the time of the filtration, the ultrasonic waves may be continuously or intermittently applied while the liquid passes through the filter. By the filtration while applying ultrasonic waves, clogging of the filter is prevented, and the continuous operation time can be prolonged.

On the other hand, in a case where ultrasonic waves are applied after the filtration, its purpose is to clean or regenerate the filter after completion of the filtration of the liquid through the filter. Accordingly, it is common that liquid supply is completely terminated, the filter cartridge is filled with a cleaning liquid as the case requires, and then application of ultrasonic waves is carried out. Further, it is also possible that the filter is taken out from the filtration facilities and then application of ultrasonic waves is carried out. In such a case, it is necessary to remove and reassemble the filter in the filtration facilities, and such is disadvantageous in the work efficiency. Thus, it is generally preferred to regenerate the filter while it is disposed in the filter cartridge.

Further, it is also preferred for improvement in the work efficiency and improvement in the regeneration ratio that filtration is once stopped, and back washing is carried out while applying ultrasonic waves. Back washing means to send the liquid in a direction opposite to that at the time of the filtration, to clean the filter.

One example of the back washing is described as follows with reference to FIG. 1.

A liquid stored in the post-filtration tank 7 is pumped out by the pump 4B, and the liquid is introduced into the filter cartridge 2 in a direction opposite to that at the time of the filtration. On that occasion, the three way valves 9B and 9C are set so that the post-filtration tank 7 and the filter cartridge 2 are connected via the pump 4B.

The liquid after the filtration passes through the filter in an opposite direction, while ultrasonic waves are applied, whereby clogging of the filter is efficiently resolved. The liquid discharged from the filter cartridge 2 passes through the three way valve 9A, and is discharged out of the system. On that occasion, the three way valve 9A is set so that the liquid discharged from the filter cartridge is discharged out of the system. This flow of the liquid is shown by white arrows in FIG. 1. The liquid which is passed in an opposite direction may not necessarily be the liquid after the filtration, and it is possible to pass water or the like.

Further, it is possible to apply ultrasonic waves both at the time of the filtration and after the filtration.

As described above, impurities in the liquid are efficiently removed by application of the ultrasonic waves, and the impurities are deposited in the filter cartridge 2. Such a deposit is preferably removed from the viewpoint of improvement in the filtration efficiency and prolongation of the life of the filter. To remove such a deposit, purge lines 8A and 8B are preferably disposed in the filter cartridge 2.

Further, the temperature of the filter cartridge tends to rise by application of the ultrasonic waves. Particularly when the ultrasonic waves are continuously applied, the temperature rise tends to be significant. In order to prevent such temperature rise of the filter cartridge and to conduct filtration operation stably for a long period of time, it is also preferred to dispose a cooling apparatus to the filter cartridge 2.

Dispersed fine particles such as a polishing composition are sometimes deteriorated with time. Thus, the liquid stored in the post-filtration tank is deteriorated, and for example, the number of coarse particles is increased in some cases. In such a case, a pipe having a pump 4C to send the liquid from the post-filtration tank 7 to the pre-filtration tank 6 may be provided.

Figure 2:
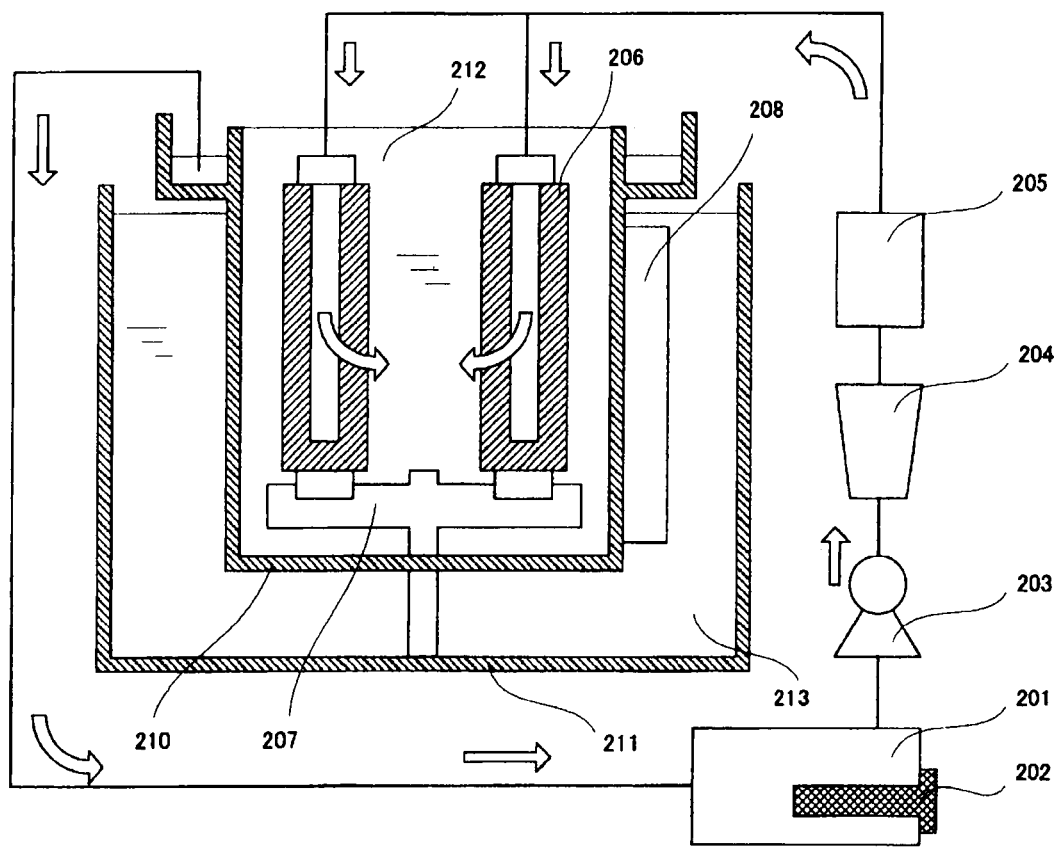
FIG. 2 is a side view schematically illustrating the filter regenerating apparatus of the present invention.
Figure 3:
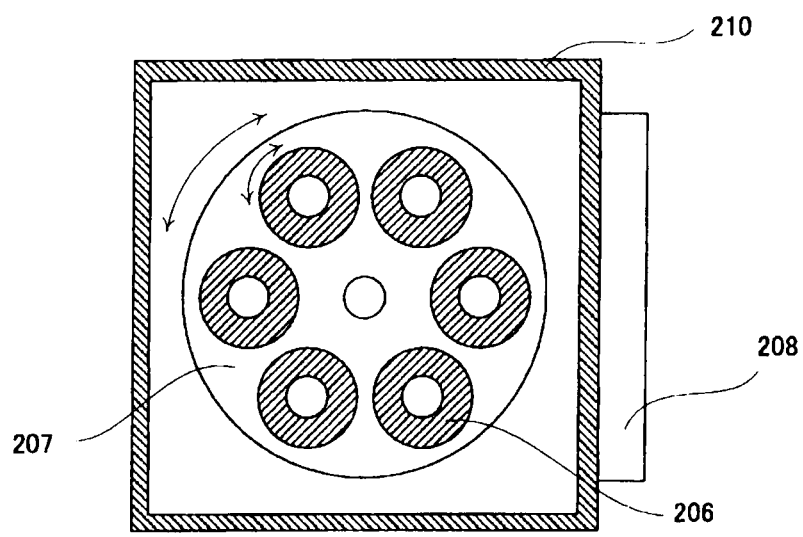
FIG. 3 is a top view schematically illustrating the disposition of filters in the filter regenerating apparatus of the present invention.

The method of filtration while cleaning of the filter is carried out was described above. As described above, cleaning of the filter while the filter is set in the filtration apparatus and filtration is continuously carried out, is preferred in view of the work efficiency. However, on the other hand, in a case where filtration of different liquids is carried out, continuous filtration of such liquids cannot be carried out, and thus the filtration operation should be once stopped. In such a case, the filter may be changed simultaneously with the change of the liquid to be subjected to filtration, whereby the loss in the work efficiency is small. Further, in a case where filtration is continuously carried out while the filter is cleaned, the above-described facilities for back washing are required, but such facilities are unnecessary when the filter is cleaned as taken out. Thus, it is sometimes advantageous to clean the filter as taken out. In a case where the filter is regenerated as taken out, it is preferred to use another filter regenerating apparatus. One embodiment of such a filter regenerating apparatus is schematically shown in FIGS. 2 and 3. FIG. 2 is a schematic view as observed from its side face, and FIG. 3 is a plan view schematically illustrating a cleaning bath.

This filter regenerating apparatus has a double structure comprising a cleaning bath (inner bath) 210 and a cooling bath (outer bath) 211. The space between these baths is filled with a temperature controlling medium 213. This medium is to adjust the temperature of the cleaning liquid in the cleaning bath 210, and the temperature is controlled by a temperature controlling apparatus (not shown). In the cleaning bath 210, a filter rotating platen 207 is disposed. This platen is to fix a filter 206 to be cleaned.

A cleaning liquid 212 to clean the filter is stored in a cleaning liquid storage tank 201, and is introduced into a resin media filter 206 to be regenerated, via a filter 204 for filtration of a cleaning liquid which removes insoluble components and the like floating in the cleaning liquid, and a flowmeter 205, by a pump 203. The cleaning liquid introduced into the filter is transmitted through the filtration face of the filter and runs off to the cleaning bath 210, and the filter is immersed in the cleaning liquid. In the filter regenerating apparatus of the present invention, ultrasonic waves at a frequency of at least 30 MHz can be applied by a ultrasonic wave generating apparatus 208 in such a state. By application of the ultrasonic waves, regeneration of the filter can efficiently be carried out. In such a manner, insoluble components such as silica particles attached to the filter are discharged into the cleaning bath 210, and the filter is regenerated.

The cleaning liquid discharged into the cleaning bath is recovered in the cleaning liquid storage tank via piping, and is utilized for further regeneration. On that occasion, it is preferred to provide a temperature controlling apparatus 202 to the cleaning liquid storage tank thereby to control the temperature. The order of connection and the number of the pump, the filter for filtration of a cleaning liquid, the flowmeter and the like are not particularly limited, and they can be connected in optional order depending upon the purpose of use.

In the filter regenerating apparatus of the present invention, as shown in FIG. 3, it is possible to fix a plurality of filters simultaneously in the filter rotating platen 207. More efficient filter regeneration can be carried out by simultaneously treating a plurality of filters. Further, the filter rotating platen may be rotated, whereby ultrasonic waves are uniformly applied to the plurality of filters. In such a case, the rotation of the rotating platen 207 may be reversed, not in a constant direction. Further, the respective filters 206 may be rotated, whereby uniform application of ultrasonic waves to any portion of the respective filters becomes possible. By combining rotation of the rotating platen, i.e. revolution, and rotation of the respective filters, i.e. rotation, more uniform and more efficient filter regeneration can be realized.

The ultrasonic wave generating apparatus 208 used is not particularly limited so long as it can apply ultrasonic waves at a frequency of at least 30 kHz, but is preferably an ultrasonic vibrator capable of adjusting ultrasonic waves depending upon the electric energy applied. Further, as described above, it is preferred to change the frequency of the ultrasonic waves, and accordingly an ultrasonic vibrator with a modulating function may also be employed. Further, it is also possible to dispose a plurality of ultrasonic wave generating apparatus so as to uniformly apply ultrasonic waves to the filter to be regenerated. Particularly when a plurality of filters to be regenerated are fixed, it is preferred to dispose such an apparatus so that the ultrasonic waves are uniformly applied to the respective filters. Here, it is preferred to properly adjust the position of the ultrasonic wave generating apparatus so that the ultrasonic waves are uniformly applied to the filter. Further, it is also preferred to dispose the apparatus so that the ultrasonic waves are uniformly applied to any part of the respective fixed filters.

Further, FIG. 2 illustrates a filter regenerating apparatus in which the cleaning liquid is supplied to the inside of the used filter and is passed to the outside, but the liquid may be passed in the opposite direction, or the direction of the cleaning liquid may be reversed at the time of cleaning. When the direction of the cleaning liquid is opposite to the direction when the filter is used for the filtration, the regeneration efficiency will be higher.

Now, the present invention will be described in further detail with reference to Examples.

EXAMPLES 1 TO 11 AND COMPARATIVE EXAMPLES 1 TO 4

As a liquid to be subjected to filtration, a dispersion liquid containing colloidal silica having an average particle size of 50 nm as measured by a BET method at a concentration of 40 wt % was prepared. On the other hand, a pipe-shaped membrane filter (filter size; overall length: about 50 mm, outer diameter: about 70 mm, inner diameter: 25 to 30 mm) contained in a resin cartridge having an overall length of about 50 mm as identified in Table 1 was set in a filtration apparatus, and filtration was carried out by using a diaphragm pump under an air sending pressure of 0.25 MPa. Filtration was continued until the filtration was no longer possible by clogging, and the volume (A) of the dispersion liquid which had been subjected to filtration was measured.

Subsequently, regeneration treatment of the used filter was carried out. 5 L of pure water was passed through the filter after completion of the filtration in a direction opposite to that at the time of the filtration, and then the filter was taken out, the filter was put in water in a bath of an ultrasonic apparatus, and ultrasonic waves were continuously applied at an output of 0.7 W/cm$^2$ for 5 minutes. The frequency of the ultrasonic waves was as identified in Table 1.

The ultrasonic wave generating apparatus used were as follows.

26 kHz PHENIX II (tradename, manufactured by Kaijo Corporation)

38 kHz PHENIX FM (tradename, manufactured by Kaijo Corporation)

50 kHz CLIMPULSE H (tradename, manufactured by Kaijo Corporation)

78 kHz PHENIX LEGEND (tradename, manufactured by Kaijo Corporation)

100 kHz PHENIX LEGEND (tradename, manufactured by Kaijo Corporation)

200 kHz ULTRA GENERATION (tradename, manufactured by SUNCORPORATION)

950 kHz HI MEGASONIC (tradename, manufactured by Kaijo Corporation)

In Example 9, after application of ultrasonic waves, back washing was carried out in which 5 L of pure water was further passed through the filter in a direction opposite to that at the time of the filtration. Further, in Comparative Examples 3 and 4, back washing in the same manner as in Example 9 was carried out, but no application of ultrasonic waves was carried out.

After completion of the regeneration treatment, the filter was set in the filtration apparatus again, and the colloidal silica dispersion liquid was subjected to filtration again. Filtration was continued until the filtration was no more possible by clogging, and the volume (B) of the dispersion liquid which had been subjected to filtration was measured.

In such a manner, the filtration capacity as before and after the regeneration treatment was measured, and the ratio B/A was regarded as the filter regeneration ratio.

Further, the filtration accuracy was defined as follows.

Number of coarse particles having particle sizes of 0.56 μm or larger contained in the dispersion liquid which had been subjected to filtration was measured as before and after the regeneration treatment by a number counting apparatus (manufactured by Particle Sizing Systems, Accusizer 780APS), and evaluated based on the following evaluation standards.

Good: The numbers of coarse particles before and after the regeneration treatment being the same.

Fairly good: The number of coarse particles after the regeneration being at least 0.9 based on the number of coarse particles before the regeneration.

Poor: The number of coarse particles after the regeneration being less than 0.9 based on the number of coarse particles before the regeneration.

Further, metal impurities were evaluated as follows.

By using an inductively coupled plasma mass spectrometer (manufactured by Agilent Technologies, model HP4500 (tradename)) as a measuring apparatus, metal contents of Na, Al, K, Ca, Ti, Cr, Fe, Ni, Cu, Zn, Ag and Pb were measured, and evaluated based on the standards; good: each metal content being at most 500 ppb, and poor: a metal content exceeding 500 ppb.

The obtained results are as shown in Table 1.

mm) having an aperture of 0.2 µm contained in a resin cartridge having an overall length of about 50 mm was set in a filtration apparatus, and filtration was carried out by using a diaphragm pump under an air sending pressure of 0.25 MPa. Filtration was carried out until the filtration was no longer possible by clogging, and then regeneration of the filter was carried out by a filter regenerating apparatus as shown in FIG. 2. The regeneration ratio was 42% in a case where the frequency of the ultrasonic waves applied was constant at 38 kHz (Example 13), whereas the regeneration ratio was further improved to 55% in a case where the frequency was modulated by ±5% (Example 14).

EXAMPLES 15 TO 18

Filtration and regeneration in the same manner as in Example 13 were repeatedly carried out three times, and the

TABLE 1

|  | Filter | | | Frequency | | Filter | | |
|---|---|---|---|---|---|---|---|---|
|  | Material | Type | Aperture (µm) | of ultrasonic waves (kHz) | Back washing | regeneration ratio | Filtration accuracy | Metal impurities |
| Ex. 1 | Nylon 66 | Membrane | 0.2 | 38 | Nil | 0.83 | Good | Good |
| Ex. 2 | Nylon 66 | Membrane | 0.2 | 50 | Nil | 0.80 | Good | Good |
| Ex. 3 | Nylon 66 | Membrane | 0.2 | 78 | Nil | 0.78 | Good | Good |
| Ex. 4 | Nylon 66 | Membrane | 0.2 | 100 | Nil | 0.60 | Good | Good |
| Ex. 5 | Nylon 66 | Membrane | 0.2 | 200 | Nil | 0.55 | Good | Good |
| Ex. 6 | Nylon 66 | Membrane | 0.2 | 950 | Nil | 0.40 | Good | Good |
| Ex. 7 | Cellulose acetate | Membrane | 0.2 | 38 | Nil | 0.80 | Good | Good |
| Ex. 8 | PTFE | Membrane | 0.2 | 38 | Nil | 0.82 | Good | Good |
| Ex. 9 | Polyethersulfone | Membrane | 0.2 | 38 | Nil | 0.30 | Good | Good |
| Ex. 10 | Polyethersulfone | Membrane | 0.2 | 38 | Nil | 0.80 | Good | Good |
| Ex. 11 | Polypropylene | Nonwoven fabric | 0.25 | 38 | Nil | 0.80 | Fairly good | Good |
| Comp. Ex. 1 | Nylon 66 | Membrane | 0.2 | 26 | Nil | (Broken) | Poor | Good |
| Comp. Ex. 2 | Metal | — | 1.0 | 38 | Nil | 0.80 | Poor | Poor |
| Comp. Ex. 3 | Nylon 66 | Membrane | 0.2 | Nil | Conducted | 0.29 | Good | Good |
| Comp. Ex. 4 | Polyethersulfone | Membrane | 0.2 | Nil | Conducted | 0.25 | Good | Good |

As evident from Table 1, if the frequency of the ultrasonic waves is lower than the range specified in the present invention, the filter was broken and could not be recycled (Comparative Example 1).

In a case where a filter made of a polyethersulfone was used, regeneration tended to be insufficient by regeneration treatment only by application of ultrasonic waves (Example 6), but when back washing was added (Example 7), sufficient regeneration was carried out.

EXAMPLE 12

Using the same filtration apparatus and filter as in Example 1, filtration was carried out while applying ultrasonic waves at a frequency of 38 kHz. The time until the filter was clogged extended to 1.5 times as compared with Example 1. Further, the filter regeneration ratio and the filtration accuracy were at the same level as in Example 1.

EXAMPLES 13 AND 14

As a liquid to be subjected to filtration, a dispersion liquid containing colloidal silica having an average particle size of 35 nm as measured by a BET method (an average particle size of 70 nm as measured by a light scattering method) at a concentration of 20 wt % was prepared. On the other hand, a nylon membrane filter (filter size; overall length: about 50 mm, outer diameter: about 70 mm, inner diameter: 25 to 30 change of the filter regeneration ratio was measured. For the cleaning liquid, pure water, a 0.1% KOH aqueous solution, a 0.2% KOH aqueous solution and a 2.0% KOH aqueous solution were used. The obtained results are as shown in Table 2.

TABLE 2

|  |  | Regeneration ratio (%) | | |
|---|---|---|---|---|
|  | Cleaning liquid | First regeneration | Second regeneration | Third regeneration |
| Ex. 15 | Pure water | 77 | 56 | 38 |
| Ex. 16 | 0.1% KOH | 78 | 60 | 46 |
| Ex. 17 | 0.2% KOH | 79 | 68 | 52 |
| Ex. 18 | 2.0% KOH | 99 | 98 | 98 |

EXAMPLE 19

As a liquid to be subjected to filtration, an aqueous dispersion liquid containing 25 wt % of fumed silica having an average particle size of 35 nm as measured by a BET method (an average particle size of 150 nm as measured by a light scattering method) and having the pH adjusted to 11.0 by potassium hydroxide, was prepared. On the other hand, a depth filter made of polypropylene (filter size; overall length: about 50 mm, outer diameter: about 70 mm, inner diameter: 25 to 30 mm) having an aperture of 1 µm contained in a resin cartridge having an overall length of about 50 mm was set in a filtration apparatus, and filtration was carried out by using a diaphragm pump under an air sending pressure of 0.25 MPa. Filtration was carried out until the filtration was no longer possible by clogging, and the filter after the filtration was regenerated by a cleaning liquid by changing the temperature, and the regeneration ratios were evaluated. The regeneration ratio was 75% at a temperature of 20° C., and the regeneration ratios were 82% and 84% at temperatures of the cleaning liquid of 40° C. and 50° C., respectively. Here, the filter was sometimes broken if the cleaning liquid temperature exceeded 60° C.

MEANINGS OF SYMBOLS

1: Resin media filter
2: Filter cartridge
3: Ultrasonic vibrator
4A, 4B: Liquid sending pump
6: Pre-filtration tank
7: Post-filtration tank
8A, 8B: Purge line
201: Cleaning liquid storage tank
202: 202
203: Pump
204: Filter for filtration of cleaning liquid
205: Flowmeter
206: Resin media filter
207: Filter rotating platen
208: Ultrasonic generating apparatus
210: Cleaning bath
211: Cooling bath
212: Cleaning liquid
213: Temperature controlling medium

The invention claimed is:

1. A filtration method, comprising:
  filtering a liquid with a tubular resin media filter that is disposed in a filter cartridge;
  removing the tubular resin media filter from the filter cartridge and immersing the tubular resin media filter in a cleaning liquid present in a tank, wherein the tubular resin media filter is oriented vertically within the tank and is disposed on a top horizontal surface of a platen within the tank, wherein an outer surface of a vertical wall the tank comprises an ultrasonic wave generating apparatus, and wherein an interior of the resin media tubular filter is connected to a pressurized source of the cleaning liquid;
  applying ultrasonic waves at a frequency of at least 30 kHz to the tubular resin media filter; and
  backwashing the tubular resin media filter with the pressurized source of the cleaning liquid, thereby regenerating said tubular resin media filter,
  wherein a material of the tubular resin media filter is at least one member selected from the group consisting of nylon, polycarbonate, polytetrafluoroethylene (PTFE), polysulfone, polyether sulfone, and cellulose and
  wherein, for the regeneration of said tubular resin media filter, said applying results in a filter regeneration ratio of at least 0.40.

2. The filtration method according to claim 1, wherein the tubular resin media filter is a membrane filter.

3. The filtration method according to claim 2, wherein the membrane filter is in the form of a cartridge.

4. The filtration method according to claim 1, wherein the material of the tubular resin media filter is a nylon selected from the group consisting of nylon 6 and nylon 66.

5. The filtration method according to claim 1, wherein an output of the ultrasonic waves is from 0.1 to 3.0 W/cm$^2$.

6. The filtration method according to claim 1, wherein the liquid is a dispersion liquid comprising fine particles.

7. The filtration method according to claim 1, wherein a material of the tubular resin media filter is polytetrafluoroethylene (PTFE).

8. The filtration method according to claim 1, wherein a material of the tubular resin media filter is at least one member selected from the group consisting of polycarbonate, polytetrafluoroethylene (PTFE), polysulfone, polyether sulfone, and cellulose.

9. The filtration method according to claim 1, wherein said ultrasonic waves are applied at a frequency of from 30 to 50 kHz.

10. The filtration method according to claim 1, wherein the platen is a rotating platen, and the platen comprises a plurality of tubular resin media filters.

11. The filtration method according to claim 1, wherein, on a surface of the resin media filter, a support material comprising a mesh resin layer is disposed.

12. A method for purifying a polishing composition, the method comprising subjecting the polishing composition to filtration by the filtration method of claim 1.

13. A filtration method, comprising:
  filtering a liquid with a tubular resin media filter that is disposed in a filter cartridge;
  removing the tubular resin media filter from the filter cartridge and immersing the tubular resin media filter in a cleaning liquid present in a tank, wherein the tubular resin media is oriented vertically within the tank and is disposed on a top horizontal surface of a rotatably platen within the tank, wherein an outer surface of a vertical wall the tank comprises an ultrasonic wave generating apparatus, and wherein an interior of the tubular resin media filter is connected to a pressurized source of the cleaning liquid;
  applying ultrasonic waves at a frequency of at least 30 kHz to the tubular resin media filter;
  rotating the platen; and
  backwashing the tubular resin media filter with the pressurized source of cleaning liquid, thereby regenerating said tubular resin media filter,
  wherein a material of the resin media filter is at least one member selected from the group consisting of nylon, polycarbonate, polytetrafluoroethylene (PTFE), polysulfone, polyether sulfone, and cellulose, and
  wherein for the regeneration of said tubular resin media filter, said applying results in a filter regeneration ratio of at least 0.40.

* * * * *